United States Patent
Buck

(10) Patent No.: US 8,684,638 B2
(45) Date of Patent: Apr. 1, 2014

(54) PRECISION TURNING TOOL

(75) Inventor: Guenter Buck, Huelben (DE)

(73) Assignee: Wohlhaupter GmbH, Frickenhausen (DE)

( * ) Notice: Subject to any disclaimer, the term of this patent is extended or adjusted under 35 U.S.C. 154(b) by 0 days.

(21) Appl. No.: 13/453,217

(22) Filed: Apr. 23, 2012

(65) Prior Publication Data

US 2012/0269590 A1 Oct. 25, 2012

Related U.S. Application Data

(63) Continuation of application No. PCT/EP2010/066284, filed on Oct. 27, 2010.

(30) Foreign Application Priority Data

Oct. 29, 2009 (DE) .......................... 10 2009 051 843

(51) Int. Cl.
 *B23B 29/10* (2006.01)
(52) U.S. Cl.
 USPC .............................. 408/16; 408/181; 408/185
(58) Field of Classification Search
 USPC ........... 408/16, 181, 185, 197, 147, 150, 151, 408/153
 IPC ....................................................... B23B 29/10
 See application file for complete search history.

(56) References Cited

U.S. PATENT DOCUMENTS

| | | | | |
|---|---|---|---|---|
| 2,435,065 A | * | 1/1948 | Zempel | 408/182 |
| 2,590,420 A | * | 3/1952 | Lagher | 340/680 |
| 2,874,597 A | * | 2/1959 | Bach | 408/16 |
| 3,730,636 A | * | 5/1973 | Mizoguchi | 408/169 |
| 4,043,696 A | * | 8/1977 | Wohlhaupter | 408/179 |
| 4,500,233 A | * | 2/1985 | Dehn | 408/182 |
| 4,676,127 A | * | 6/1987 | Watanabe | 82/1.2 |
| 4,710,073 A | * | 12/1987 | Peterson | 408/181 |
| 5,251,511 A | * | 10/1993 | Muendlein et al. | 82/1.2 |
| 5,611,651 A | | 3/1997 | Wohlhaupter et al. | |

(Continued)

FOREIGN PATENT DOCUMENTS

| | | |
|---|---|---|
| DE | 30 315 | 8/1968 |
| DE | 42 42 063 | 2/1995 |

(Continued)

OTHER PUBLICATIONS

Advertisement, Machines Production, Sofetec, Boulogne, France, No. 546, pp. 89, 91, XP000169111, Dec. 12, 1990.

*Primary Examiner* — Eric A Gates
(74) *Attorney, Agent, or Firm* — Lipsitz & McAllister, LLC

(57) ABSTRACT

A precision turning tool has a rotatingly drivable tool body. A tool slide and corresponding compensating slide are displaceably mounted in the tool body. The tool slide is displaceable along an axis of adjustment aligned at right angles to an axis of rotation of the tool body. The compensating slide is automatically displaceable along an axis of compensation aligned parallel to the axis of adjustment contrary to the movement of the tool slide to compensate for any imbalance. At an end projecting out of the tool body in the direction of adjustment the tool slide has a mounting surface, on which a cutting plate carrier can be mounted. An electronic distance measuring system is provided with a display unit and an energy supply device, wherein the distance of adjustment of the tool slide can be detected by means of the distance measuring system and displayed.

13 Claims, 3 Drawing Sheets

(56) References Cited

U.S. PATENT DOCUMENTS

| | | | |
|---|---|---|---|
| 5,857,811 A * | 1/1999 | Kaiser et al. | 407/101 |
| 5,906,460 A | 5/1999 | Link et al. | |
| 5,909,986 A | 6/1999 | Kaiser et al. | |
| 6,840,719 B2 * | 1/2005 | Tugend et al. | 408/181 |
| 7,585,139 B2 | 9/2009 | Stadelmann et al. | |
| 2006/0239787 A1 | 10/2006 | Stadelmann et al. | |
| 2010/0054882 A1 | 3/2010 | Frank et al. | |

FOREIGN PATENT DOCUMENTS

| | | |
|---|---|---|
| DE | 195 45 802 | 2/2000 |
| DE | 10 2007 004 383 | 7/2008 |
| EP | 0 804 984 | 2/2000 |
| EP | 0 804 983 | 12/2001 |
| EP | 1 716 950 | 11/2006 |
| JP | 1171707 | 7/1989 |
| WO | WO 91/03345 | 3/1991 |

* cited by examiner

PRECISION TURNING TOOL

This application is a continuation of international application number PCT/EP2010/066284 filed on Oct. 27, 2010 and claims the benefit of German application number 10 2009 051 843.6 filed on Oct. 29, 2009.

The present disclosure relates to the subject matter disclosed in international application number PCT/EP2010/066284 of Oct. 27, 2010 and German application number 10 2009 051 843.6 of Oct. 29, 2009, which are incorporated herein by reference in their entirety and for all purposes.

BACKGROUND OF THE INVENTION

The invention relates to a precision turning tool with a tool body rotatingly drivable about an axis of rotation, a tool slide and a compensating slide coupled to the tool slide via a transmission mechanism being displaceably mounted in said tool body, wherein the tool slide is displaceable by means of a precision adjustment mechanism along an axis of adjustment aligned at right angles to the axis of rotation, and wherein the compensating slide is automatically displaceable by means of the transmission mechanism along an axis of compensation aligned parallel to the axis of adjustment contrary to the movement of the tool slide for the purpose of compensating for any imbalance, and wherein the tool slide has a mounting surface at an end protruding out of the tool body in a direction of adjustment, a cutting plate carrier being adapted to be mounted on said mounting surface.

Precision turning tools of this type are known from DE 42 42 063 C2 and EP 0 804 984 B1. Mainly bores with narrow tolerances are machined with their aid. For that purpose they can be clamped into the spindle of a machine tool. The bore can be machined in a metal removing manner by means of a cutting plate which is secured to the cutting plate carrier. In order to set the desired turning or boring radius, the tool slide can be adjusted radially with respect to the axis of rotation of the tool body. The compensating slide, which is coupled to the tool slide via the transmission mechanism, performs a movement in the opposite direction during any adjustment of the tool slide and so the respective masses are shifted such that the precision turning tool is balanced as a whole on account of the relative movement of the two slides.

In the case of the precision tool known from DE 42 42 063 C2 the adjustment of the tool slide is brought about via the transmission mechanism as a result of displacement of the compensating slide with the aid of a micrometer screw. The compensating slide therefore forms the drive for the adjustment of the tool slide.

In the case of the precision turning tool known from EP 0 804 984 B1, the tool slide is adjusted directly with the aid of a precision adjustment mechanism which comprises an adjusting screw.

The adjustment of the tool slide can be read on a scale with a vernier in the case of the known precision turning tools. The reading of the scale does, however, require some practice.

Precision turning tools are also known, with which the radial adjustment of a tool slide can be read from a digital display. However, such precision turning tools enable, so far, only a lateral mounting of the cutting plate carrier on the longitudinal side of the tool slide facing away from a shaft of the tool body. This, on the other hand, leads to the turning or boring radius being adjustable only to a slight extent. The total travel which can be achieved with the tool slide is very limited. Moreover, precision turning tools of this type are characterized thus far by a considerable external diameter. Also, the cutting speeds which can be achieved are not very high in the case of such precision turning tools.

The object of the present invention is to further develop a precision turning tool of the type specified at the outset in such a manner that the distance of adjustment can be read in a simple manner even when travel of the tool slide is considerable.

SUMMARY OF THE INVENTION

This object is accomplished in accordance with the invention, in a precision turning tool of the generic type, in that the precision turning tool comprises an electronic distance measuring system with a display unit as well as an energy supply device for supplying energy to the distance measuring system, wherein the distance of adjustment of the tool slide can be detected by means of the distance measuring system and displayed on the display unit.

The precision turning tool according to the invention is characterized by a mounting of the cutting plate carrier on the end of the tool slide protruding out of the tool body in a direction of adjustment, wherein the distance of adjustment can be read directly on the display unit. The mounting on the end of the tool slide protruding out of the tool body in a direction of adjustment enables the tool slide to be adjusted over a considerable distance of adjustment, preferably a distance of adjustment of more than 5 mm, in particular a distance of adjustment of 7 to 9 mm. The distance of adjustment can be read by the user in a simple manner on the display unit. It may, in particular, be provided for the distance of adjustment to be shown directly on the display unit in micrometers.

The energy required for the electronic distance measuring system is provided by the energy supply device arranged on or in the tool body. It is not necessary to connect the electronic distance measuring system to an external source of energy.

The precision turning tool according to the invention is preferably characterized by a tool body with an external diameter of less than 60 mm, in particular an external diameter of at the most 55 mm. An external diameter of the tool body of at the most 50 mm has proven to be particularly favorable. Despite the relatively small external diameter, the tool slide can be adjusted in a radial direction by at least 5 mm, preferably at least 7 mm.

The distance of adjustment of the tool slide can be detected without contact in an advantageous embodiment of the precision turning tool according to the invention. An optical detection of the distance of adjustment can, for example, take place.

It is favorable when a differential value can be displayed on the display unit of the distance measuring system which represents the distance of adjustment from a zero position which can be predetermined by the user to a current position of the tool slide.

It may be provided for a measuring scale to be arranged on the tool slide which can be detected without contact by the distance measuring system. The measuring scale can favorably be detected optically, wherein the light reflected by the measuring scale can be detected by a sensor and evaluated in an electronic evaluation unit.

The energy supply device preferably comprises at least one battery which can be inserted into the tool body.

In a particularly preferred embodiment of the precision turning tool according to the invention, a clamping device is arranged in the tool body for clamping the tool slide securely in a desired position, wherein the clamping device has a clamping body which is adapted to be actuated by the user for exerting a clamping force, wherein the clamping force can be transferred to the tool slide via a force transmission element lying flat on the tool slide. With such a configuration, the tool slide can be clamped securely in the position desired by the user. For this purpose, the tool slide is acted upon with a clamping force which is transferred from a clamping body, for example a clamping screw, via a force transmission element to the tool slide. The clamping of the tool slide is not therefore brought about directly by the clamping body but rather at least one force transmission element is arranged between the clamping body and the tool slide. The force transmission element lies flush against the tool slide. It has been shown that such a configuration of the clamping device enables the tool slide to be clamped securely without there being the risk of the tool slide being misadjusted on account of the clamping force acting on it. The user can move the tool slide into the desired position with the aid of the precision adjustment mechanism. The user can read the position of the tool slide which has been reached directly on the display unit. If the tool slide has reached the desired end position, it can be clamped securely by means of the clamping device, wherein there is practically no risk of the tool slide being misadjusted unintentionally on account of the clamping force acting on it.

It is particularly favorable when the force transmission element forms a securing element securing the tool slide against any turning about the axis of adjustment. The force transmission element in such a configuration serves not only for exerting a clamping force but the force transmission element also undertakes the function of a device securing against rotation and so it is ensured that the tool slide will not be rotated about the axis of adjustment when it is securely clamped. A separate device for securing against rotation can therefore be omitted.

The tool slide is preferably designed essentially in a cylindrical shape. This simplifies the production and assembly of the tool slide.

The force transmission element is favorably held in the tool body so as to be adjustable. The adjustable mounting enables the force transmission element to be mounted in the tool body with clearance, wherein the clearance can be adjusted. By adjusting the clearance it can be ensured in a simple manner that the tool slide itself, in the case of an essentially cylindrical design, does not perform any rotary movement either during adjustment or during clamping in a desired end position. In addition, it is ensured by the adjustable mounting of the force transmission element that it does not move the tool slide in a radial direction during clamping in a desired position.

The force transmission element is preferably held in the tool body with clearance, wherein the clearance can be adjusted by means of an adjusting element. An adjusting screw can be used, for example, as adjusting element.

It is of particular advantage when the force transmission element is designed as a wedge-shaped piece which lies flush against the tool slide with a wedge surface.

It is particularly favorable when the wedge-shaped piece can be adjusted in the tool body parallel to its axis of rotation. It has been shown that, as a result, the adjustment of the optimum position of the wedge-shaped piece relative to the tool slide is simplified.

It is of advantage when the wedge-shaped piece is held in a recess of the tool body which is covered by a cover, wherein an adjusting element interacting with the wedge-shaped piece is mounted in the cover so as to be adjustable. This enables the constructional space for the wedge-shaped piece held in the tool body with clearance and the adjusting element interacting with it to be kept particularly small.

Favorably, the tool slide and the compensating slide are adapted to be clamped securely by means of the clamping device at the same time. During use of the precision turning tool, both the tool slide and also the compensating slide are subject to a considerable centrifugal force. So that the centrifugal force does not lead to any alteration of the position of the tool slide, it is favorable when, in the desired end position of the tool slide, not only the tool slide itself but also the compensating slide can be clamped securely. In the advantageous embodiment, both slides can be clamped securely by means of the clamping device at the same time. This enables both slides to be fixed reliably in the desired end position with the aid of a single clamping procedure.

The clamping device preferably has a clamping bolt which is adapted to be acted upon by the clamping body with a clamping force and which exerts a clamping force on the force transmission element in a first longitudinal section and which exerts a clamping force on the compensating slide in a second longitudinal section.

It is of particular advantage when the clamping bolt abuts directly on the force transmission element in its first longitudinal section. Above all, an areal abutment, in particular a flat abutment of the clamping bolt on the force transmission element, has proven to be particularly favorable.

In its second longitudinal section, the clamping bolt preferably abuts directly on the compensating slide. The compensating slide is therefore acted upon directly with a clamping force by the clamping bolt, whereas the tool slide is acted upon with a clamping force only indirectly by the clamping bolt since the force transmission element is arranged between the clamping bolt and the tool slide.

It is of particular advantage with a view to achieving as small a constructional space as possible when the clamping bolt and the force transmission element are arranged in a common recess of the tool body which is covered by a cover, in which an adjusting element interacting with the force transmission element is mounted so as to be adjustable.

As already explained, the force transmission element can be designed in the form of a wedge-shaped piece which lies flush against the tool slide with a first wedge surface. The wedge-shaped element preferably has a second wedge surface, against which the clamping bolt lies flush.

The wedge-shaped piece can preferably be adjusted at right angles to the clamping force which is exerted on the tool slide by the clamping bolt via the wedge-shaped piece. This enables the wedge-shaped piece to be positioned in such a manner that the tool slide can be adjusted in a radial direction with respect to the axis of rotation of the tool body in a simple manner by means of the precision adjustment mechanism once the user has previously released the clamping body, wherein the tool slide can, however, be clamped securely in a desired end position in a simple manner as a result of actuation of the clamping body, wherein both the tool slide and the compensating slide will be locked by means of the clamping bolt.

The clearance of the wedge-shaped piece can preferably be adjusted by means of an adjusting screw which is mounted in the cover, which covers the common recess for the clamping bolt and the wedge-shaped piece, so as to be rotatable.

As already explained, the position of the tool slide can be detected with the aid of the electronic distance measuring system. The energy supply is provided by the energy supply device. This is preferably arranged in a battery compartment of the tool body which can be closed in a liquid-tight manner.

It may be provided, for example, for the battery compartment to be covered by a cover, wherein at least one sealing element is arranged between the cover and the tool body.

The tool body favorably comprises a shaft for the non-rotating connection to the spindle of a machine tool and the battery compartment is accessible at the outer face of the tool body facing away from the shaft.

Alternatively, it may be provided for the battery compartment to be accessible at a casing surface of the tool body. The battery compartment is, with such a design, advantageously arranged between the shaft of the tool body and the compensating shaft.

The electronic distance measuring system is preferably positioned at the level of the transmission mechanism, via which the tool slide is coupled to the compensating slide.

The transmission mechanism in one advantageous embodiment comprises a toothed wheel or a toothed roller which meshes with rows of teeth of the tool slide and the compensating slide.

The compensating slide of one advantageous embodiment is held for displacement on a guide bolt which passes through a recess of the tool body.

The guide bolt makes a simple guidance of the compensating slide along the axis of compensation possible.

The guide bolt is advantageously aligned coaxially to the axis of compensation.

It is of particular advantage when the recess accommodating the compensating slide forms a passage of the tool body which is closed at its two ends by a respective cover, wherein the guide bolt connects the two covers to one another. This simplifies the production and assembly of the precision turning tool.

It is favorable when the compensating slide is surrounded in circumferential direction by an elastic guiding element which abuts on the wall of a recess of the tool body which accommodates the compensating slide.

The elastic guiding element is preferably arranged in an annular groove of the compensating slide.

It may be provided, for example, for the elastic guiding element to be designed in the form of a sealing ring which surrounds the compensating slide in circumferential direction.

The following description of one preferred embodiment of the invention serves to explain the invention in greater detail in conjunction with the drawings.

DETAILED DESCRIPTION OF THE INVENTION

Figure 1:
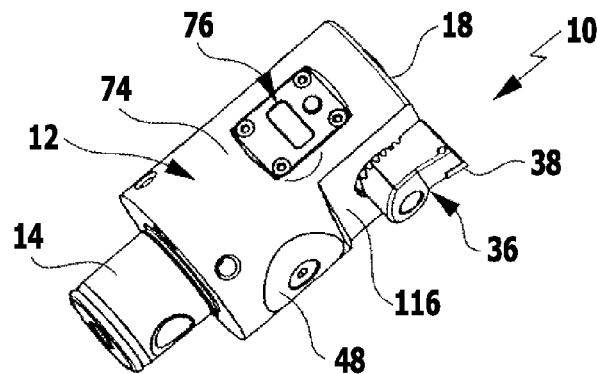
FIG. 1: shows a perspective illustration of a first embodiment of a precision turning tool according to the invention.
Figure 2:
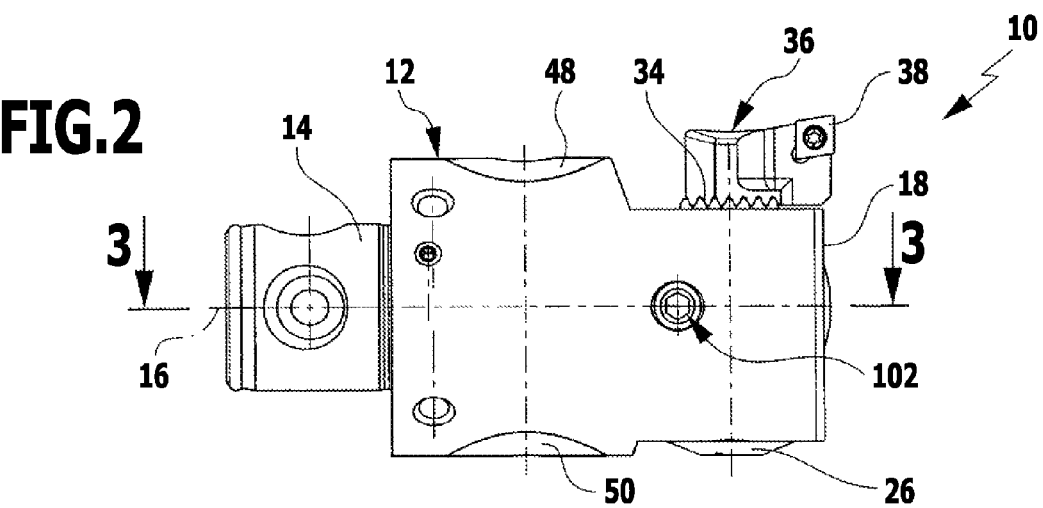
FIG. 2: shows a side view of the precision turning tool from FIG. 1.
Figure 3:
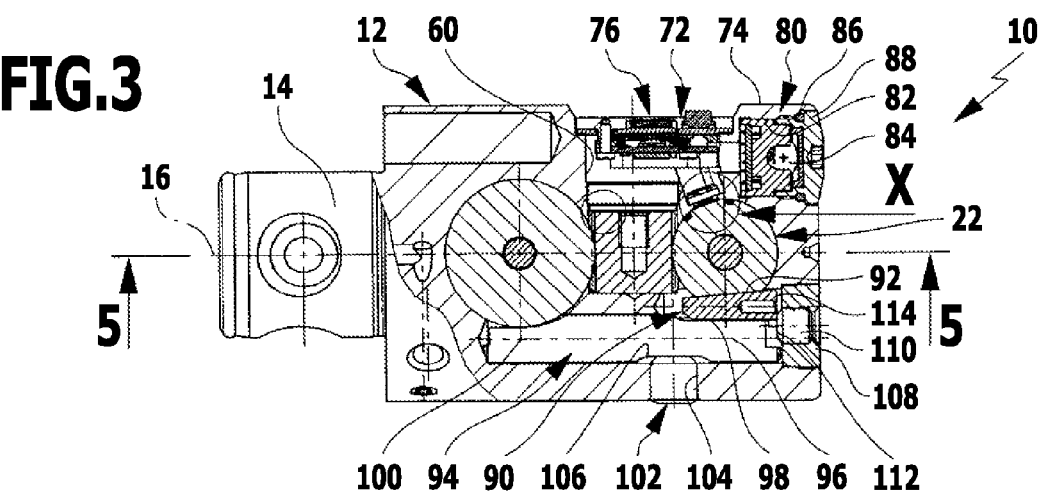
FIG. 3: shows a sectional view of the precision turning tool along line 3-3 in FIG. 2.
Figure 4:
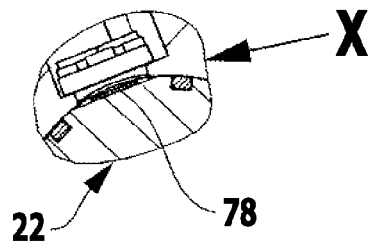
FIG. 4: shows an enlarged illustration of detail X from FIG. 3.

A first embodiment of a precision turning tool according to the invention, which is given altogether the reference numeral 10, is illustrated schematically in FIGS. 1 to 6. It comprises an essentially circular cylindrical tool body 12, from which a shaft 14 projects which, for example by means of a chuck, can be clamped into a rotatingly driven spindle of a machine tool and so the precision turning tool 10 rotates about a common axis of rotation 16 together with the spindle of the machine tool.

Adjacent to an outer face 18 of the tool body 12 facing away from the shaft 14 the tool body 12 has a front recess 20 which passes through the tool body 12 at right angles to the axis of rotation 16 and into which a tool slide 22 is inserted. The tool slide 22 can be adjusted along an axis of adjustment 24 which is aligned at right angles to the axis of rotation 16. For this purpose, a precision adjustment mechanism is used which has a cover 26 which is held at one end of the front recess 20 and a spindle 28 which is mounted for rotation in the cover 26. The spindle 28 dips into a longitudinal bore 30 of the tool body 12 and interacts with an internal thread which is arranged in the longitudinal bore 30 and not illustrated in the drawings. When the spindle 28 is turned, the tool slide 22 can be adjusted in a radial direction along the axis of adjustment 24.

The tool slide 22 projects out of the front recess 20 with an end 32, which is the outer face with respect to the axis of adjustment 24 and faces away from the cover 26, and forms a mounting surface 34, on which a cutting plate holder 36 can be mounted. The cutting plate holder 36 bears a cutting plate 38 for the metal-cutting machining of a workpiece.

At a distance from the front recess 20 the tool body 12 has a rear recess 40 which runs parallel to the front recess 20 and accommodates a compensating slide 42. The rear recess 40 forms a passage of the tool body 12 which is closed at its two ends by a first cover 48 and a second cover 50, respectively. The compensating slide 42 has a longitudinal bore 44 which has a guide bolt 46 passing through it. The guide bolt 46 connects the first cover 48 to the second cover 50. The compensating slide 42 can be moved along the guide bolt 46 which is aligned coaxially to an axis of compensation 52. The axis of compensation 52 extends parallel to the axis of adjustment 24 of the tool slide 22.

The tool slide 22 is coupled to the compensating slide 42 via a transmission mechanism 54. The transmission mechanism 54 comprises a toothed roller 56 which is mounted in a central recess 60 of the tool body 12, which is arranged between the front recess 20 and the rear recess 40, so as to be rotatable about an axis 62 of the toothed roller which is aligned at right angles to the axis of rotation 16 and at right angles to the axis of compensation 52. The toothed roller 26 meshes, on the one hand, with a first row of teeth 64 which is arranged on the outer side of the tool slide 22 and, on the other hand, with a second row of teeth 66 which is arranged on the outer side of the compensating slide 42. If the tool slide 22 is moved along the axis of adjustment 24 by means of the spindle 28, the compensating slide 42 performs a compensating movement along the axis of compensation 52 which is directed contrary to the movement of the tool slide 22 so that the respective masses of the tool slide 22 and of the compensating slide 42 are shifted such that the precision turning tool 10 is, altogether, always balanced automatically.

The compensating slide 42 has along its circumference an annular groove 68, in which an elastic guiding element is arranged in the form of a sealing ring 70 which slides along the wall of the rear recess 40 when the compensating slide 42 is moved and guides the compensating slide 42.

The central recess 60 widens above the toothed roller 56 and accommodates an electronic distance measuring system 72 which has in the region of a casing surface 74 of the tool body 12 a digital display unit 76, on which the user can read the distance of adjustment of the tool slide 22 in micrometers, wherein the distance of adjustment corresponds to the differential value between a zero position of the tool slide 22 predetermined by the user and its actual position which it takes up for machining a workpiece. In order to detect the distance of adjustment, the position of the tool slide 22 will be detected without contact by the electronic distance measuring system 72. The tool slide 22 has, for this purpose, on the outside, facing the electronic distance measuring system 72, a measuring tape 78 which will be scanned optically by the electronic distance measuring system 72, wherein the light reflected by the measuring tape 78 will be detected by a sensor of the electronic distance measuring system 72 and a corresponding sensor signal will be evaluated by an electronic evaluation device of the distance measuring system 72. Such electronic distance measuring systems 72 are known per se to the person skilled in the art and do not, therefore, require more detailed explanation in the present case. The distance of adjustment of the tool slide 22 can be detected without contact by means of the electronic distance measuring system 72 and displayed on the display unit 76.

For the purpose of supplying energy to the electronic distance measuring system 72 the precision turning tool 10 has an energy supply device 80. This is arranged in a battery compartment 82 and comprises at least one battery 84 which can be inserted into the battery compartment 82. The at least one battery 84 is connected to the electronic distance measuring system 72 in an electrically conductive manner via electrical connection lines which are known per se and not, therefore, illustrated in the drawings. The battery compartment opens, in the embodiment illustrated in FIGS. 1 to 6, into the outer face 18 of the tool body 12 facing away from the shaft 14 and is closed by a cover 88 in a fluid-tight manner with the interposition of a sealing ring 86. By releasing the cover 88 the battery compartment 82 is accessible for exchanging the at least one battery 84.

The tool slide 22 is of a circular cylindrical design apart from a flattened area arranged on the underside facing away from the electronic distance measuring system 72 and the energy supply device 80. A force transmission element in the form of a wedge-shaped piece 90 with a first wedge surface 92 lies flush against the flat underside. The wedge-shaped piece 90 is arranged between the tool slide 22 and a clamping bolt 94 which is aligned parallel to the axis of rotation 16 of the tool body 12 and in a first longitudinal section 96 lies flush against a second wedge surface 98 of the wedge-shaped piece 90 which faces away from the first wedge surface 92. In a second longitudinal section 100 the clamping bolt 94 abuts areally on the compensating slide 42.

With the aid of a clamping body in the form of a clamping screw 102 the clamping bolt 94 can exert a clamping force on both the tool slide 22 and also the compensating slide 42 at the same time and so both slides can be clamped securely at the same time as a result of actuation of the clamping screw 102. The clamping screw 102 passes through a radial bore 104 of the tool body 12 and opens into a longitudinal recess 106 which accommodates not only the clamping bolt 94 but also the wedge-shaped piece 90 and is closed by a cover 108 at the outer face 18.

An adjusting element in the form of an adjusting screw 110 is rotatably mounted in the cover 108. The adjusting screw 110 abuts with an adjusting surface 112 on an upper side 114 of the wedge-shaped piece 90 which faces the outer face 18 of the tool body 12. The position of the wedge-shaped piece 90 can be adjusted parallel to the axis of rotation 16 of the tool body 12 as a result of the adjusting screw 110 being turned. This allows the clearance of the wedge-shaped piece 90 to be set by means of the adjusting screw 110 such that, on the one hand, it is ensured that the tool slide 22 can be adjusted in a radial direction as a result of rotation of the spindle 28 once the clamping screw 102 has been released in order to adjust a desired turning or boring radius but that, on the other hand, the tool slide 22 and the compensating slide 42 can be clamped securely at the same time when the clamping screw 102 is tightened.

During clamping of the tool slide 22, a clamping force is exerted on the tool slide 22 proceeding from the clamping screw 102 via the clamping bolt 94 and the wedge-shaped piece 90. The areal abutment of the wedge-shaped piece 90 on the tool slide 22 ensures that the tool slide 22 will not be moved in the direction of the axis of adjustment 24 nor tilted about the axis of adjustment 24 during clamping. The clamping of the tool slide 22 does not, therefore, lead to any alteration in its position along the axis of adjustment 24 and, therefore, to any alteration of the distance of adjustment displayed on the display unit 76.

The wedge-shaped piece 90 undertakes not only the function of a force transmission element, via which the clamping force can be transferred to the tool slide 22, but also, at the same time, the wedge-shaped piece 90 forms a device securing against rotation on account of the areal abutment of its first wedge surface 92 on the flat underside of the tool slide 22 and this ensures that the tool slide 22, during adjustment along the axis of adjustment 24, does not perform any rotary movement about the axis of adjustment 24.

The wedge-shaped piece 90 is arranged together with the clamping bolt 94 in the longitudinal recess 106 in the tool body 12 which is closed by the cover 108. This makes a very compact design of the precision turning tool 10 possible, wherein the external diameter of the tool body 12 can be kept relatively small despite the use of the balance compensation by means of the compensating slide 42 and the transmission mechanism 54 and the use of the electronic distance measuring system 72 with a digital display unit 76. The external diameter of the tool body 12 can be less than 60 mm, for example 50 to 55 mm. It may also be provided for the external diameter of the tool body 12 to be less than 50 mm. The external diameter of the tool body 12 can, in particular, be less than 45 mm, for example 42 mm. Despite the relatively small external diameter of the tool body 12, the travel which can be achieved with the tool slide 22, i.e. the distance of adjustment covered by the tool slide 22, is more than 5 mm, for example 7 to 9 mm.

Figure 5:
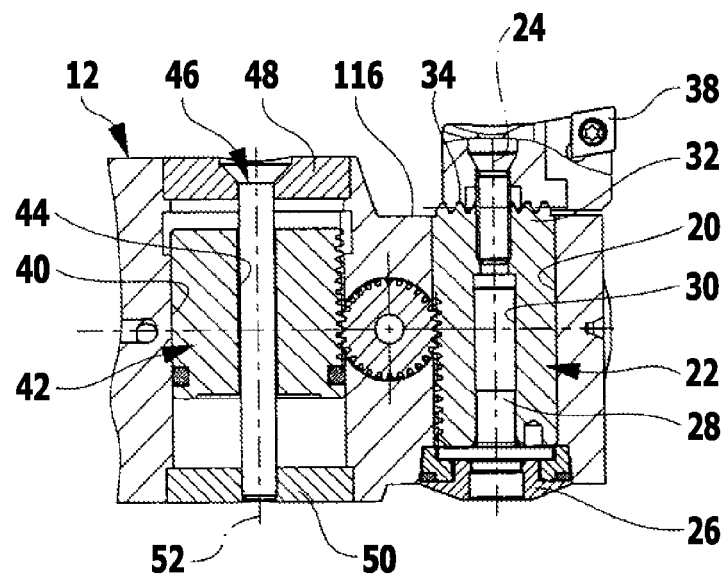
FIG. 5: shows a sectional view along line 5-5 in FIG. 3, wherein a tool slide of the precision turning tool takes up an inner end position.
Figure 6:
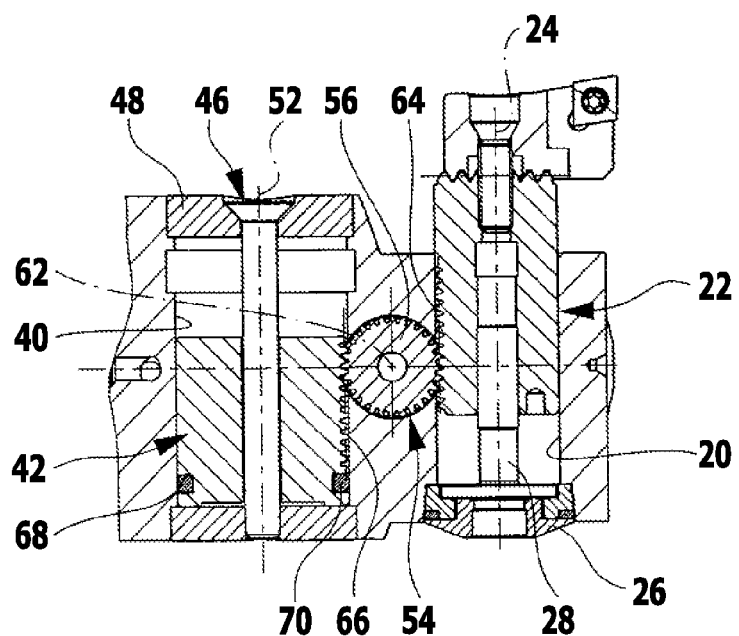
FIG. 6: shows a sectional view according to FIG. 5, wherein the tool slide takes up an outer end position

The tool slide 22 is illustrated in FIG. 5 in an inner end position, in which it dips almost completely into the front recess 29 and so the mounting surface 34 is positioned at the level of an external flattened area 116 of the tool body 12. This position of the tool slide 22 corresponds to a minimum turning or boring radius. By rotating the spindle 28, the tool slide 22 can be moved out of the front recess 20 in the direction facing away from the cover 26 to such an extent that the mounting surface 34 takes up the outer end position illustrated in FIG. 6 which corresponds to a maximum turning or boring radius. The difference in the distance between the inner end position illustrated in FIG. 5 and the outer end position of the tool slide 22 illustrated in FIG. 6 corresponds to the distance which it can travel. This is at least 5 mm, preferably 7 to 9 mm.

The distance traveled by the tool slide 22 can, in particular, be approximately one third of its length in relation to the axis of adjustment 24.

The precision turning tool 10 is balanced over the entire distance of adjustment of the tool slide 22 on account of the movement of the compensating slide 42 in the opposite direction. This makes extremely precise machining of a workpiece possible, wherein a very high cutting speed can be achieved with a relatively small constructional size of the tool body 12.

Figure 7:
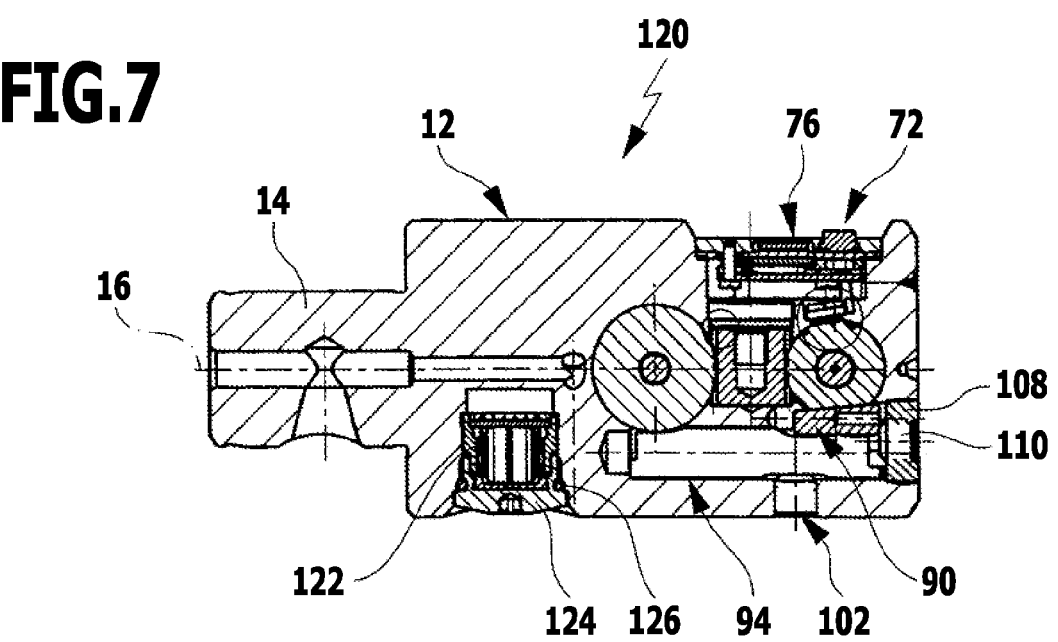
FIG. 7 shows a sectional view according to FIG. 3 of a second embodiment of a precision turning tool according to the invention.

In the case of the first embodiment of a precision turning tool according to the invention, illustrated in FIGS. 1 to 6, the battery compartment is arranged in the region of the outer face 18 of the tool body 12. Such a positioning of the battery compartment 82 is, however, not absolutely necessary. A second embodiment of a precision turning tool according to the invention is illustrated in FIG. 7 and this has, altogether, the reference numeral 120. The precision turning tool 120 is of a substantially identical design to the precision turning tool 10 explained above. Therefore, the same reference numerals are used in FIG. 7 for components identical to those of FIGS. 1 to 6 and with respect to these components reference is made to the preceding explanations in order to avoid repetitions.

The precision turning tool 120 differs from the precision turning tool 10 in that instead of the battery compartment 82 arranged at the outer face a battery compartment 122 which is arranged to the side is used and this is arranged beneath the longitudinal recess 106 in a region between the rear recess 40 and the shaft 14. The battery compartment 122 also accommodates at least one battery 84 and can be closed so as to be fluid-tight by means of a cover 124, which is arranged to the side, with the interposition of a sealing ring 126. The at least one battery 84 arranged in the battery compartment 122 is connected to the electronic distance measuring system 72 in an electrically conductive manner via electrical connection lines which are not illustrated in the drawings.

The precision turning tool 120 illustrated in FIG. 7 is characterized by a particularly small external diameter of the tool body 12. The external diameter can, for example, be less than 45 mm, in particular 42 mm. Despite the very small constructional space the precision turning tool 120 displays considerable travel of the tool slide 22, wherein the precision turning tool 120 is balanced over the entire distance of adjustment of the tool slide 22 as a result of the use of the compensating slide 42 which moves in the opposite direction and can, therefore, be used for extremely precise machining of a workpiece.

The invention claimed is:

1. Precision turning tool, comprising:
   a tool body rotatingly drivable about an axis of rotation,
   a tool slide, and
   a compensating slide coupled to the tool slide via a transmission mechanism being displaceably mounted in said tool body,
   the tool slide being displaceable by means of a precision adjustment mechanism along an axis of adjustment aligned at right angles to the axis of rotation,
   the compensating slide being automatically displaceable by means of the transmission mechanism along an axis of compensation aligned parallel to the axis of adjustment contrary to a movement of the tool slide for the purpose of compensating for any imbalance,
   the tool slide having a mounting surface at an end protruding out of the tool body in a direction of adjustment, a cutting plate carrier being adapted to be mounted on said mounting surface, and
   an electronic distance measuring system with a display unit and an energy supply device for supplying energy to the distance measuring system,
   wherein:
   a distance of adjustment of the tool slide is adapted to be detected by means of the distance measuring system and displayed on the display unit,
   a clamping device is arranged in the tool body for clamping the tool slide securely in a desired position,
   the clamping device has a clamping body actuatable by a user for exerting a clamping force,
   the clamping force is transferable to the tool slide via a force transmission element lying flat on the tool slide,
   the clamping device has a clamping bolt acted upon with a clamping force by the clamping body, and
   the clamping bolt exerts a clamping force on the force transmission element in a first longitudinal section and exerts a clamping force on the compensating slide in a second longitudinal section.

2. Precision turning tool as defined in claim 1, wherein a measuring scale detectable by the distance measuring system without contact is arranged on the tool slide.

3. Precision turning tool as defined in claim 1, wherein the force transmission element forms a securing element securing the tool slide against any turning about the axis of adjustment.

4. Precision turning tool as defined in claim 1, wherein the force transmission element is held in the tool body so as to be adjustable.

5. Precision turning tool as defined in claim 1, wherein:
   the force transmission element is held in the tool body with clearance,
   the clearance is adjustable by means of an adjusting element.

6. Precision turning tool as defined in claim 1, wherein the force transmission element is designed as a wedge-shaped piece lying flat on the tool slide with a wedge surface.

7. Precision turning tool as defined in claim 1, wherein the tool slide and the compensating slide are adapted to be clamped securely by means of the clamping device at the same time.

8. Precision turning tool as defined in claim 1, wherein the clamping bolt abuts directly on the force transmission element in the first longitudinal section.

9. Precision turning tool as defined in claim 1, wherein the clamping bolt abuts directly on the compensating slide in the second longitudinal section.

10. Precision turning tool as defined in claim 1, wherein the energy supply device is arranged in a battery compartment of the tool body closable so as to be fluid-tight.

11. Precision turning tool as defined in claim 10, wherein:
    the tool body has a shaft for a non-rotating connection to a spindle of a machine tool, and
    the battery compartment is accessible at an outer face of the tool body facing away from the shaft.

12. Precision turning tool as defined in claim 1, wherein the compensating slide is held for displacement on a guide bolt passing through a recess in the tool body.

13. Precision turning tool as defined in claim 12, wherein:
    the recess forms a passage of the tool body closed at both ends by a respective cover,
    the guide bolt connects the covers to one another.

* * * * *